(12) United States Patent
Hayasaka

(10) Patent No.: US 8,332,957 B2
(45) Date of Patent: Dec. 11, 2012

(54) STORAGE DEVICE

(75) Inventor: Kaname Hayasaka, Iruma (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1097 days.

(21) Appl. No.: 12/053,493

(22) Filed: Mar. 21, 2008

(65) Prior Publication Data

US 2008/0244737 A1 Oct. 2, 2008

(30) Foreign Application Priority Data

Mar. 26, 2007 (JP) ................................ 2007-079377

(51) Int. Cl.
*G06F 7/04* (2006.01)
*G06F 17/30* (2006.01)
*H04N 7/16* (2011.01)

(52) U.S. Cl. .......................................... 726/28; 726/21

(58) Field of Classification Search .............. 726/26–30, 726/21; 713/193–194, 500–502; 711/100
See application file for complete search history.

(56) References Cited

U.S. PATENT DOCUMENTS

| 6,374,310 | B2 | 4/2002 | Isomura | |
|---|---|---|---|---|
| 6,647,505 | B1* | 11/2003 | Dangi et al. | 713/502 |
| 7,661,142 | B2* | 2/2010 | Daos et al. | 726/26 |
| 2001/0056543 | A1 | 12/2001 | Isomura | |
| 2006/0224902 | A1* | 10/2006 | Bolt | 713/193 |
| 2006/0236126 | A1* | 10/2006 | Adams et al. | 713/193 |
| 2009/0100290 | A1* | 4/2009 | Nakanishi et al. | 714/5 |
| 2010/0024041 | A1* | 1/2010 | Yasaki et al. | 726/26 |

FOREIGN PATENT DOCUMENTS

| JP | 11-175406 A | 7/1999 |
|---|---|---|
| JP | 2006-59228 A | 3/2006 |

\* cited by examiner

*Primary Examiner* — Eleni Shiferaw
*Assistant Examiner* — Jing Sims
(74) *Attorney, Agent, or Firm* — Seed IP Law Group PLLC

(57) ABSTRACT

A storage device has a data erasing function. A controller of a storage device, such as an USB, has a lost timer section and an emergency timer section. Both timer sections halt clocking operation as a result of initiation of use of the storage device by an authorized user. The lost timer section commences clocking operation as a result of completion of use of the storage device by the authorized user. The emergency timer section commences clocking operation as a result of unauthorized removal of the storage device. When either the lost timer section or the emergency timer section outputs a count-up signal, data in flash ROM are erased.

13 Claims, 4 Drawing Sheets

STORAGE DEVICE

PRIORITY INFORMATION

This application claims priority to Japanese Patent Application No. 2007-079377 filed on Mar. 26, 2007, which is incorporated herein by reference in its entirety.

BACKGROUND

1. Technical Field

The present invention relates to a storage device, and more particularly to a security function.

2. Related Art

Since flash memory is compact, large-capacity, nonvolatile memory, a range of applications of the memory is rapidly widening. For example, the USB memory has increased in capacity and widely used as an auxiliary storage device of a computer. However, the security of the USB memory, or the like, cannot be said to be perfect, and important data in the memory may leak when lost or stolen.

JP 2006-59228 A describes a storage device intended for thoroughly erasing data, such as that fetched from a predetermined information processing apparatus and temporarily stored, at the time of occurrence of a specific event. Data captured from a personal computer by way of a USB terminal are stored in RAM serving as volatile memory. When a timer has detected elapse of a time selected by a user, refreshing operation of the RAM performed by a refresh circuit is stopped, to thus erase the data stored in the RAM and authentication data pertaining to the user used for encryption.

JP 11-175406 A also describes an auxiliary storage device intended for reliably preventing an unauthorized access such as to extract stored information by disintegrating information equipment. When unauthorized access is detected, a security processing section performs processing, such as erasure, encryption, or saving of data into another area.

However, a configuration for continually refreshing the entire volatile memory by means of a built-in battery affects an absolute time to retain data, and the absolute time becomes inversely proportional to the capacity of the flash memory. It may also be the case where a decrease in voltage of the built-in battery will pose a problem in refreshing operation before a time set in the timer by the user. Further, even when a malicious stranger has removed the USB memory from the personal computer without authorization during the course of use of the USB memory, the stranger may be afforded a sufficient time to extract data or disintegrate the memory until the time previously set in the timer.

SUMMARY

The present invention provides a storage device capable of reliably holding stored data and thoroughly erasing the data in various situations, such as theft, misplacement, or unauthorized removal of the device from a processing apparatus like a personal computer.

The present invention is directed toward a storage device comprising:
 a nonvolatile storage section for storing data;
 a first timer section that clocks a first predetermined time and outputs a first count-up signal, that commences clocking operation by means of taking, as a trigger, completion of use of the storage device by an authorized user, and that suspends clocking operation by means of taking, as a trigger, initiation of use of the storage device by the authorized user;
 a second timer section that clocks a second predetermined time shorter than the first predetermined time, that outputs a second count-up signal, that commences clocking operation by means of taking, as a trigger, unauthorized removal of the storage device from a predetermined information processor, and that suspends clocking operation by means of taking, as a trigger, initiation of use of the storage device by the authorized user; and
 a control section that erases the data stored in the nonvolatile storage section by means of at least any of the first count-up signal output from the first timer section and the second count-up signal output from the second timer section.

Further, the present invention is directed toward a storage device comprising:
 a nonvolatile storage section for storing a portion of data;
 a volatile storage section for storing a remaining portion of the data;
 a refreshing section for refreshing the volatile storage section;
 a first timer section that clocks a first predetermined time, that outputs a first count-up signal, that commences clocking operation by means of taking, as a trigger, completion of use of the storage device by an authorized user, and that halts clocking operation by means of taking as a trigger initiation of use of the storage device by the authorized user;
 a second timer section that clocks a second predetermined time shorter than the first predetermined time, that outputs a second count-up signal, that commences clocking operation by means of taking, as a trigger, removal of the storage device from a predetermined information processor other than authorized removal, and that halts clocking operation by means of taking, as a trigger, initiation of use of the authorized user; and
 a control section that erases the data stored in the volatile storage section by halting refreshing operation of the refresh section and by means of at least any of the first count-up signal output from the first timer section and the second count-up signal output from the second timer section.

In the present invention, erasure of data includes an arbitrary method for making data unreadable; for instance, corruption of data, encryption of data, and the like.

According to the present invention, a time is managed by means of the first timer section and the second timer section. Accordingly, data are erased without fail in accordance with various situations, such as unauthorized removal of a storage device, thereby enhancing security.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION

Embodiments of the present invention will be described hereunder by reference to the drawings.

Figure 1:
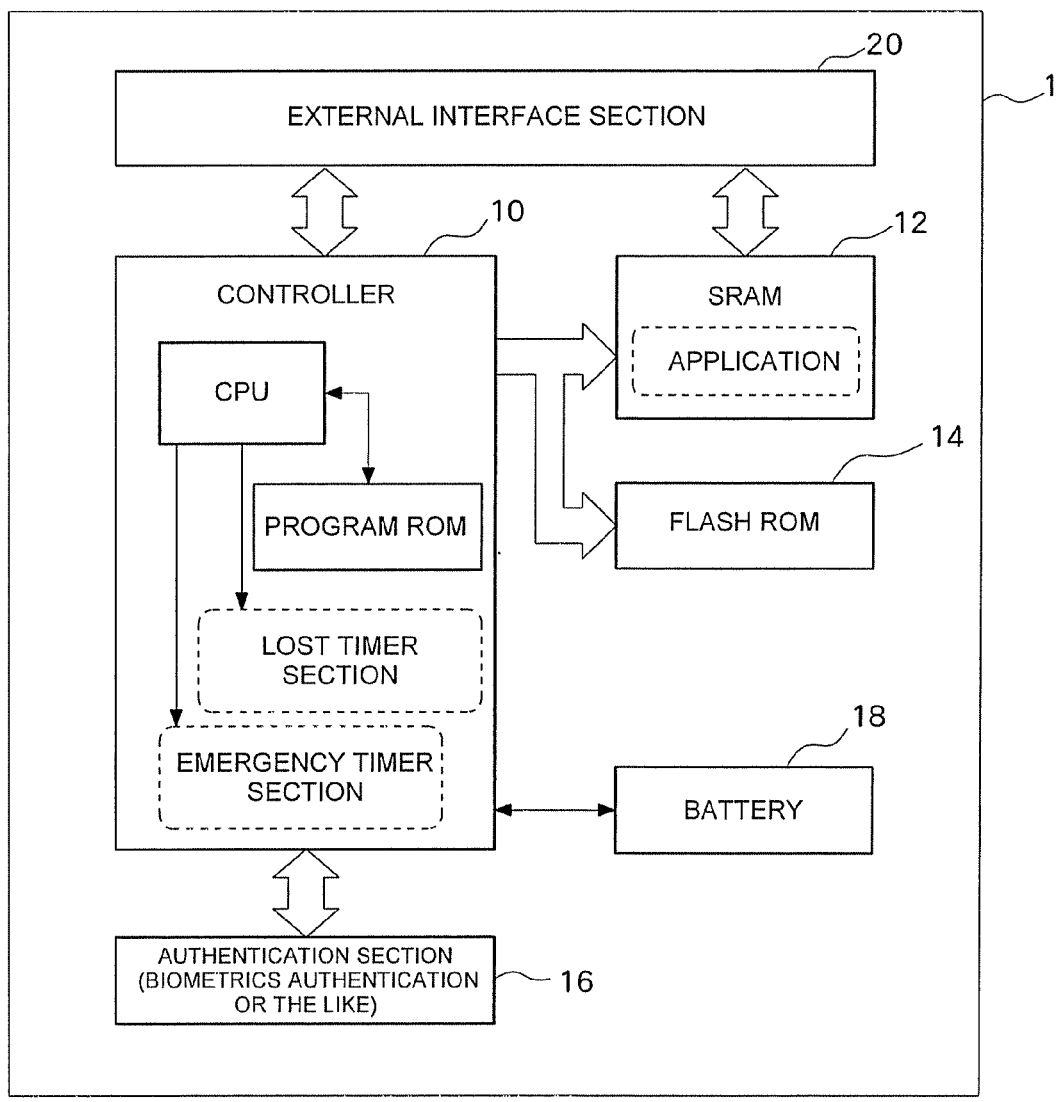
FIG. 1 is a block diagram of a USB memory of an embodiment of the present invention.

FIG. 1 shows the configuration of a USB memory 1 of a present embodiment serving as a storage device. The USB memory 1 has a controller 10, SRAM 12, flash ROM 14, an authentication section 16, a built-in battery 18, and an external interface 20.

In addition to having a CPU and program ROM, the controller 10 has a lost timer section and an emergency timer section. The lost timer section is a timer that starts clocking operation when the USB memory 1 is lost or stolen; namely, a timer that outputs a count-up signal after elapse of a first predetermined time. More specifically, the lost timer section starts clocking operation from a point in time when an authorized user has finished using the USB memory 1 and stops clocking operation when the USB memory 1 is connected to a personal computer and the user is authenticated as an authorized user; namely, when the authorized user starts use of the memory. Further, the emergency timer section is a timer that starts clocking operation in the event of unauthorized removal of the USB memory 1 other than authorized removal of the USB memory 1 and that outputs a count-up signal after elapse of a second predetermined time. More specifically, when the USB memory 1 is removed from the personal computer without going through authorized procedures; for example, when the USB memory 1 is removed by a stranger other than the authorized user or when the authorized user has erroneously removed the USB memory 1 from the personal computer, counting operation is commenced. The counting operation is stopped when the USB memory 1 is connected to the personal computer and when the user is authenticated as an authorized user; namely, when the authorized user starts using the USB memory. The lost timer section and the emergency timer section start and stop clocking operation independently. The first predetermined time is longer than the second predetermined time. The first predetermined time is set to; for example, several hours to several days, whilst the second predetermined time is set to; for example, several minutes.

The SRAM 12 stores an authentication application program for authenticating the user as an authorized user. The flash ROM 14 stores data supplied from the personal computer by way of an external interface section 20. The battery 18 supplies the controller 10 with operating power, and the authentication section 16 supplies the controller 10 with biometrics data, such as a fingerprint.

When detected connection of the USB memory 1 to the personal computer 1, the CPU of the controller 10 executes an authentication application program stored in the SRAM 12, thereby displaying a predetermined authentication screen on a screen of the personal computer. The user authenticates himself/herself as an authorized user by use of the authentication screen. Authentication is; for example, fingerprint authentication, iris authentication, vein authentication, and the like; however, authentication may also be performed by means of an ID or a password. An explanation is given below by means of taking, as an example, authentication using a password. When the user is authenticated as an authorized user, the CPU allows an access to the data stored in the flash ROM 14. As mentioned above, when the USB memory 1 is connected a personal computer and when the user is authenticated as an authorized user, a stop signal is output to the lost timer section and the emergency timer section, thereby deactivating the lost timer section and the emergency timer section. When a count-up signal is output from at least any one of the lost timer section and the emergency timer section, the CPU completely erases the data stored in the flash ROM 14.

Figure 2:
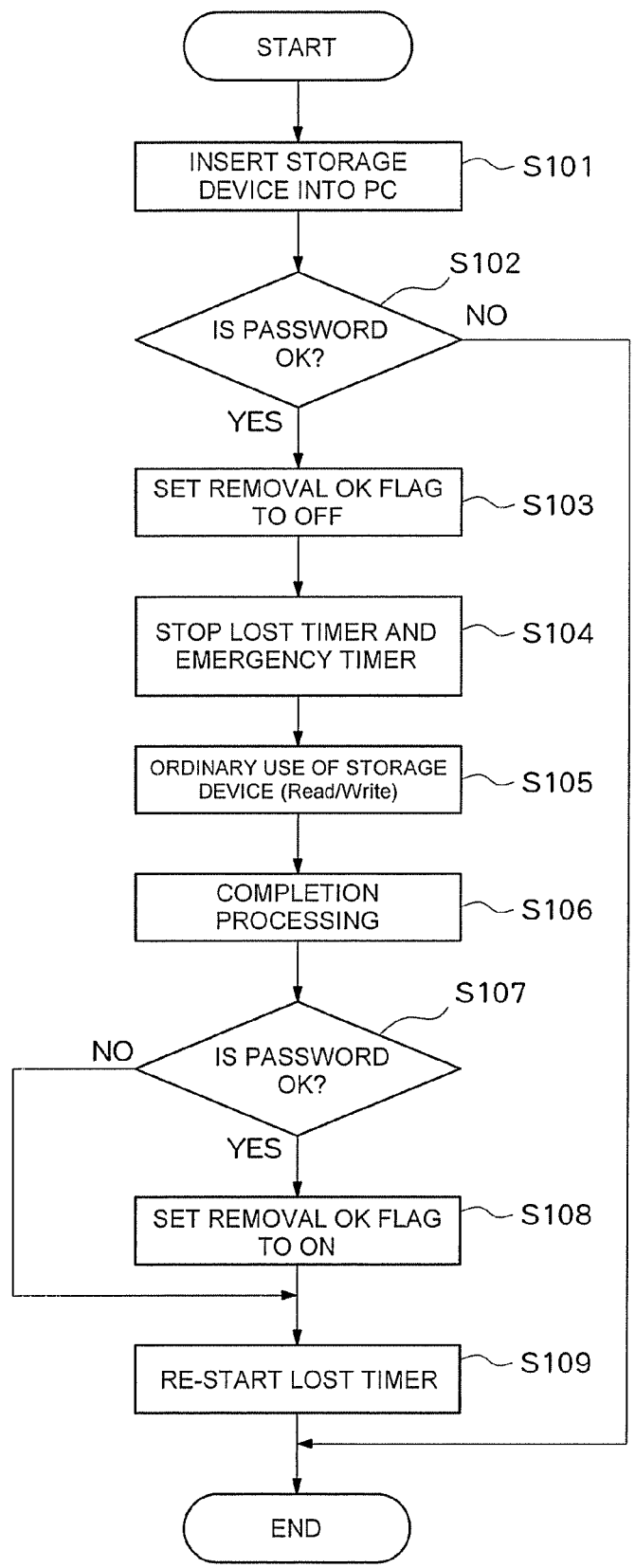
FIG. 2 is a processing flowchart employed when the USB memory is connected to a PC in the embodiment.

FIG. 2 shows processing performed in the present embodiment; namely, processing performed when the USB memory 1 is connected to a personal computer (PC).

When the USB memory 1 is connected to a USB connector of the personal computer (PC) (S101), the CPU executes an authentication application program, thereby displaying on a screen of the personal computer a screen for prompting entry of a password. The CPU determines whether or not the input password coincides with the password of the authorized user (S102). When a coincidence exists, the user is authenticated as an authorized user, and a remove-OK flag is set to an OFF position (S103). The remove-OK flag is for allowing removal of the USB memory. Setting the remove-OK flag to the OFF position means that removal of the USB memory 1 is not allowed. When the USB memory 1 is pulled out in spite of the remove-OK flag being set to the OFF position, the USB memory 1 can be determined to have been removed by a stranger other than the authorized user or erroneously removed by the authorized user. After setting the remove-OK flag to the OFF position, the CPU further outputs a stop signal to the lost timer section and the emergency timer section, thereby halting clocking operations of the timers (S104). In relation to the lost timer section, halting clocking operation means interruption of clocking operation. When clocking operation is started next time, clocking operation is initiated from a count value where the clocking operation has been interrupted. In the meantime, in relation to the emergency timer section, halting clocking operation means that the timer is reset to zero; namely, that clocking operation is started from zero when clocking operation is started next time. As a matter of course, when the authorized user desires a reset, clocking operation of the lost timer section can be reset. It is also preferably for only an administrator other than the authorized user to be able to reset clocking operation of the lost timer section. As a result, a data available time for a user, including an authorized user, can be limited to a given time.

Subsequently, the authorized user writes or reads data into or from the USB memory 1 (S105) and completes processing (S106). The CPU again requires a password for authentication even at the time of termination processing (S107). When an input password is correct, the remove-OK flag is set to an ON position, thereby allowing removal of the USB memory 1 (S108). The CPU outputs a start signal to the lost timer section, thereby resuming (restarting) the clocking operation of the lost timer section (S109). When the input password is not correct (including a case where no password is input), the remove-OK flag is still maintained in the OFF position. Further, when the lost timer section is suspended, the clocking operation of the lost timer section is resumed. When the lost timer section keeps performing clocking operation, restarting of clocking operation is not necessary. When a user other than the authorized user has used the USB memory 1, neither the lost timer section nor the emergency timer section halt clocking operation, and hence the clocking operations are continued.

As mentioned above, when, after connecting the USB memory 1 to the personal computer and writing data, the authorized user pulls the USB memory 1 out of the personal computer in an authorized fashion; namely, the authorized user pulls the USB memory out of the personal computer by going through predetermined, authorized procedures, the lost timer section commences clocking operation and continues counting operation until the first predetermined time.

Figure 3:
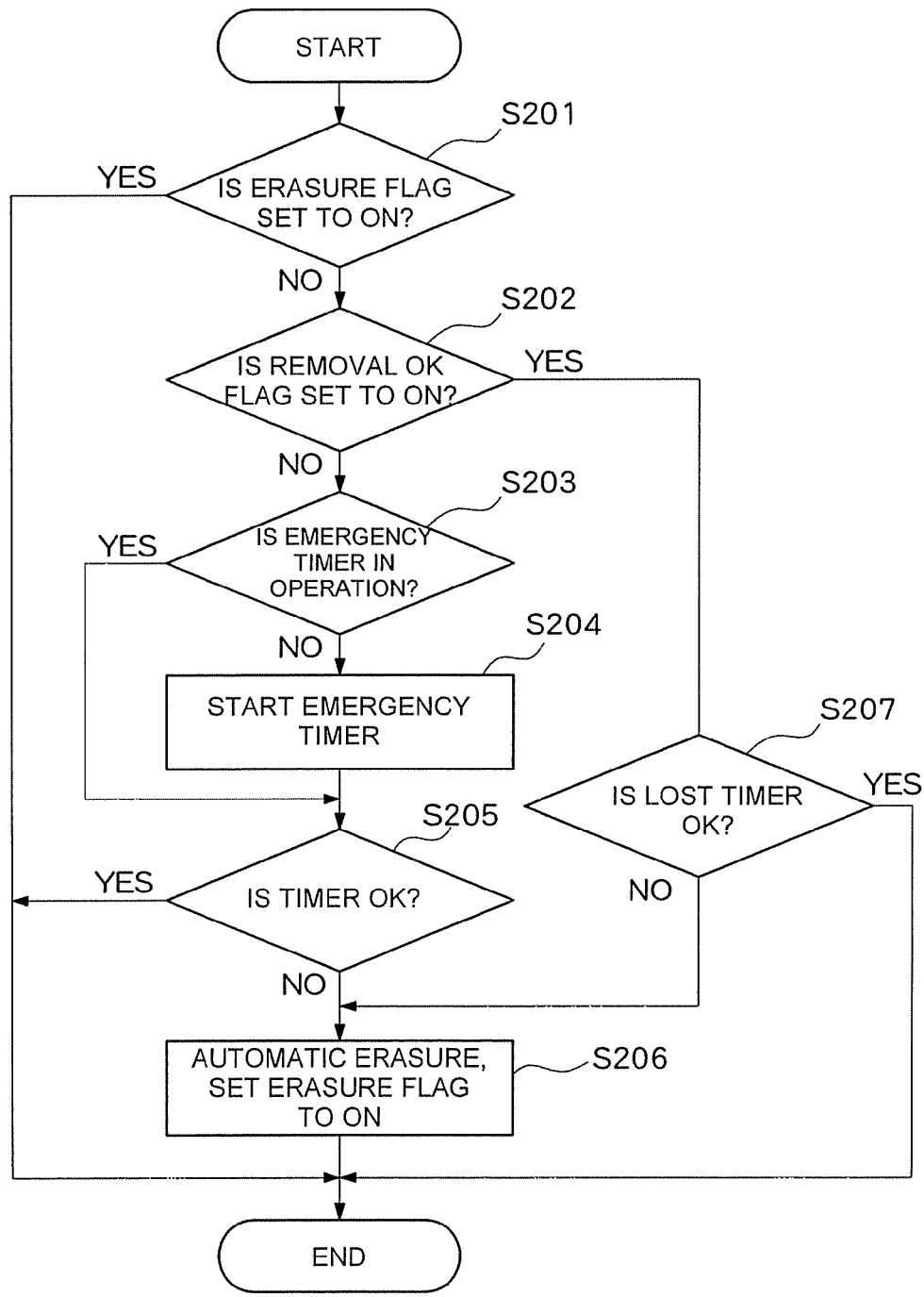
FIG. 3 is a processing flowchart employed when the USB memory of the present embodiment is used alone.

FIG. 3 shows processing performed when the USB memory 1 is used alone. First, the CPU determines whether or not an erase flag is set to one (S201). The erase flag is set to one when the CPU has already erased the data stored in the flash ROM 14. When the data still remain unerased (a default state), the erase flag is set to zero. When the erase flag is set to zero and when data still remain unerased, a determination is made as to whether or not the remove-OK flag is set to ON (S202). As mentioned above, when the USB memory 1 is pulled out in an authorized fashion, the remove-OK flag is set to the ON position. In contrast, when the USB memory is pulled out in an unauthorized manner or when the authorized user erroneously pulls out the USB memory 1, the remove-OK flag remains set to the OFF position. Accordingly, when the remove-OK flag is in the ON position, the USB memory is determined to be pulled out in an authorized fashion. Hence, in order to address a situation, such as misplacement or theft, the CPU monitors whether or not the lost timer section is OK; namely, whether or not a count-up signal is output from the lost timer section (S207).

When the lost timer section has not yet counted up, the lost timer section is determined to be OK. When the lost timer section has not yet output a count-up signal and YES is rendered as a determination, data are not erased. However, when the count-up signal is output from the lost timer section and when NO is rendered as a determination, the CPU erases all of the data stored in the flash ROM 14 (S206). As a result, diversion of data, or the like, is prevented.

In the meantime, when the remove-OK flag still remains in the OFF position, the USB memory 1 is determined to be pulled out without authorization or erroneously, the CPU ascertains operation of the emergency timer section (S203). Subsequently, when the emergency timer section remains inoperative, the CPU outputs a start signal, to thus initiate clocking operation (S204). A determination is then made as to whether or not the timer section is OK; namely, whether or not a count-up signal has been output from the timer section (S205). The timer section that performs the processing operation is either the lost timer section or the emergency timer section. When the count-up signal is output from the lost timer section or when the count-up signal is output from the emergency timer section, NO is rendered as a determination, and the CPU erases all of the data stored in the flash ROM 14 (S206). For example, when clocking operation of the emergency timer section is initiated in S204 and when the second predetermined time has elapsed, NO is rendered as a determination in S205, and the data in the flash ROM 14 are erased. Moreover, even when clocking operation of the emergency timer section is initiated in S204 and when the second predetermined time has not yet elapsed, NO is rendered as a determination in S205 after the first predetermined time has elapsed since the lost timer section commenced clocking operation, and the data in the flash ROM 14 are erased.

In a case where another person other than the authorized user connects the USB memory 1 to the personal computer, it goes without saying that processing is performed in a manner analogous to the processing flowchart employed when the USB memory 1 shown in FIG. 3 is used alone.

By reference to specific examples, explanations are provided as follows.

<Cases where the Authorized User Removes the USB Memory 1 from the PC in an Authorized Manner>

The remove-OK flag is set to an ON position in S108, and the lost time section resumes clocking operation in S109. The emergency timer section still remains halted, and the data in the flash ROM 14 are erased only when the lost timer section performs count-up operation for reasons of misplacement or theft of the USB memory 1.

<Cases where the Authorized User Uses the USB Memory 1 and Another Person has Removed the Memory from the PC or where the Authorized User has Erroneously Removed the USB Memory>

When the remove-OK flag still remains in the OFF position, and the emergency timer section starts clocking operation in S203. Since the lost timer section remains halted in S104 because the authorized user has started use of the memory, the lost timer section again resumes clocking operation in S109. When either the emergency timer section or the lost timer section has performed count-up operation in S205, the data in the flash ROM 14 are erased. Even when the USB memory is removed in a manner other than the authorized manner, the data are not erased immediately. Data are erased when either the emergency timer section or the lost time section has performed count-up operation. Specifically, data are erased after elapse of a predetermined grace period. Hence, even when the authorized user has erroneously removed the USB memory 1, data are not erased immediately. So long as the authorized user connects the USB memory 1 to the personal computer and performs authentication again, an opportunity to preserve data can be assured.

<Cases where Another Person Uses the USB Memory 1>

Both the lost timer section and the emergency timer section maintain clocking operation, and the data in the flash ROM 14 are erased when any of the emergency timer section and the lost timer section has performed count-up operation in S205. Even when another person has acquired and used the USB memory 1 immediately after the authorized user removed the USB memory from the PC, the data in the flash ROM 14 are erased as a result of the emergency timer section or the lost timer section performing count-up operation because the lost timer section has already resumed clocking operation.

As mentioned above, in the present embodiment, the two timer sections; namely, the lost timer section and the emergency timer section, manage a time, thereby erasing data. Hence, data can be protected in accordance with various situations, such as misplacement of the USB memory 1 or removal of the USB memory 1 by the authorized user.

In the present embodiment, clocking operation of the lost timer section is basically interrupted only during the course of the authorized user using the USB memory, and clocking operation is maintained in other cases. During this period, an LED, or the like, placed at a predetermined position on the USB memory 1; specifically, a position that can be viewed from the outside, may also be blinked, to thus show that clocking operation of the lost timer section is proceeding.

In the present embodiment, all of the data are stored in the flash ROM 14. However, the data may also be divided, and some of the thus-divided data may be stored in the flash ROM 14, and the remaining data may also be stored in DRAM that requires refreshing operation. The built-in battery 18 is consumed by an amount corresponding to the power required for refreshing operation. However, capacity sufficient to store some of the data is required, and hence amounts of power consumption can be reduced.

Figure 4:
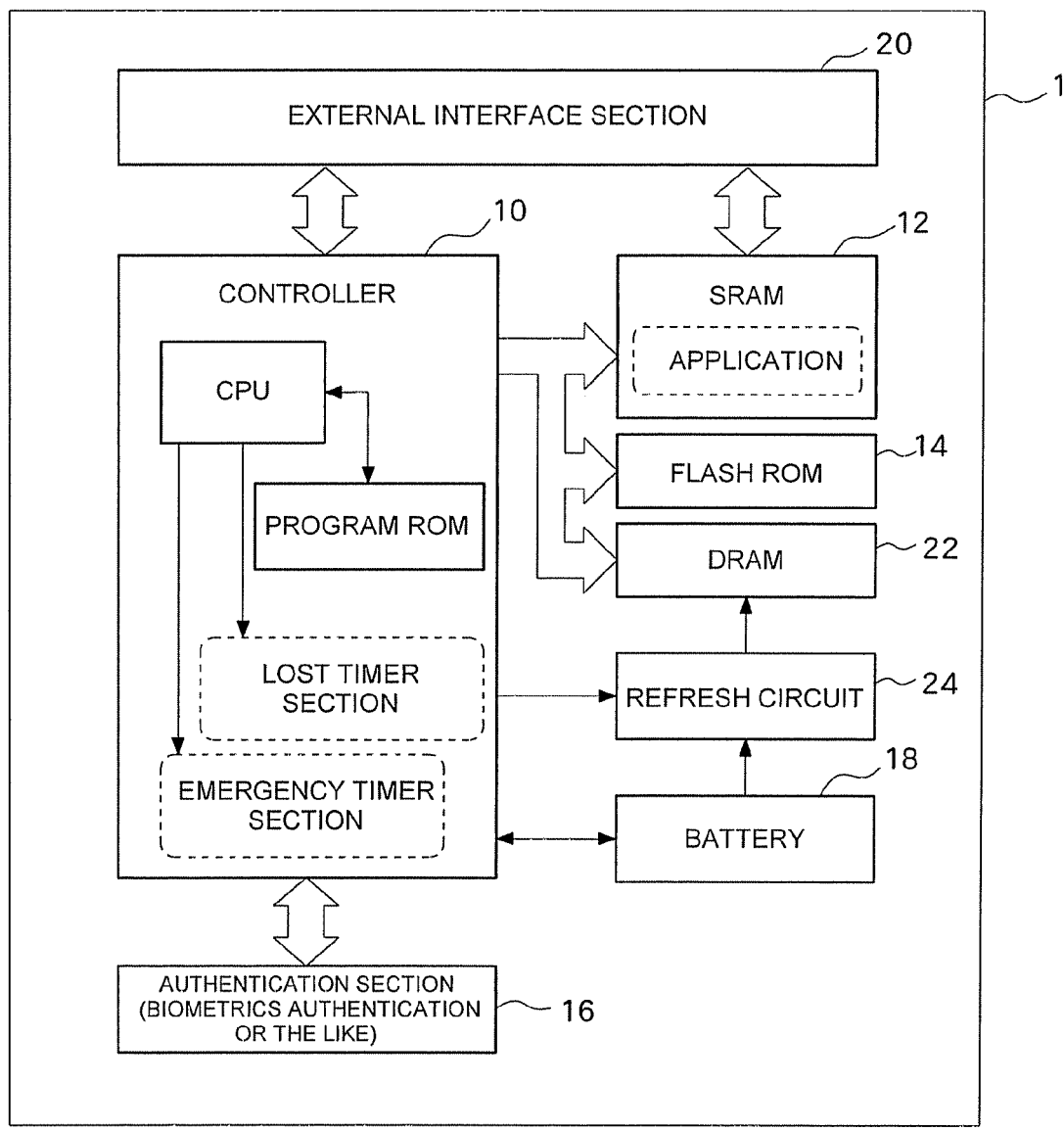
FIG. 4 is a block diagram of a USB memory of another embodiment of the present invention.

FIG. 4 shows the configuration of the USB memory 1 adopted in this case. In addition to having the configuration shown in FIG. 1, the USB memory is further provided with DRAM 22 and a refresh circuit 24. Data supplied from the personal computer are divided into two subsets of data, and the sub-sets of data are stored in the flash ROM 14 and the DRAM 22. For example, files are arranged as discontiguous clusters (sectors) in the flash ROM 14, and directory information and FAT information are stored as memory information in the DRAM 22. When a count-up signal is output from either the lost timer section or the emergency timer section, the CPU erases the data stored in the DRAM 22 by stopping refreshing operation performed by the refresh circuit 24. The data stored in the flash ROM 14 cannot be read as a result of erasure of memory management information. Hence, security can be ensured even by means of this configuration. As a matter of course, instead of the directory information and the FAT information being stored in the DRAM 22, an encryption IC chip may be provided and the data may be stored in an encrypted manner. Further, an encryption key may be stored in the DRAM 22. Alternatively, a signal line of a data bus may also be replaced with the function of an address, or a control circuit for effecting inversion may also be provided. The information may be stored in the DRAM 22, or a one-to-one conversion table for data 00h to FFh may also be stored in the DRAM 22.

In the present embodiment, data are protected by erasing the data stored in the flash ROM 14 or the DRAM 22. "Erasure of data" includes a case where original data are corrupted by writing meaningless data over the original data and a case where original data are made unbreakable by means of encryption. In short, the essential requirement is to subject original data to processing of some type, thereby bringing the original data in a form other than the original form.

Although the present embodiment has been described by means of taking the USB memory 1 as an example storage device, the present invention is not limited to the embodiment and can also be applied to; for example, SD memory or the like. The information processor is not limited to a personal computer, and the present invention can also be applied to; for example, a digital camera, a video camera, or the like.

What is claimed is:

1. A storage device comprising:
   a nonvolatile storage configured to store data;
   a first timer section configured to count up to a first predetermined time period and to output a first count-up signal at an end of the first predetermined time period, the first timer section being configured to commence first clocking operation by means of taking, as a trigger, completion of use of the storage device by an authorized user, and to suspend the first clocking operation by means of taking, as a trigger, initiation of use of the storage device by the authorized user;
   a second timer section configured to count up to a second predetermined time period shorter than the first predetermined time period and to output a second count-up signal at an end of the second predetermined time period, the second timer section being configured to commence second clocking operation by means of taking, as a trigger, unauthorized removal of the storage device from a predetermined information processor, and to suspend the second clocking operation by means of taking, as a trigger, initiation of use of the storage device by the authorized user; and
   a controller configured to erase the data stored in the nonvolatile storage by means of at least either of the first count-up signal output from the first timer section and the second count-up signal output from the second timer section.

2. The storage device according to claim 1, wherein the first timer section resumes clocking operation from a point in time when previous clocking operation is halted, by means of taking as a trigger completion of use of the storage device by the authorized user.

3. The storage device according to claim 1, wherein the first predetermined time period is set to several hours to several days, and the second predetermined time period is set to several minutes.

4. The storage device according to claim 1, further comprising:
   a program storage configured to store an authentication program for authenticating the user as an authorized user.

5. The storage device according to claim 4, wherein the authentication program is executed by a processor provided in the storage device, sets a remove-enable flag when the user is authenticated as an authorized user, and does not set a remove-enable flag when the user cannot be authenticated as an authorized user, and
   removal of the storage device from the predetermined information processor for which the removal-enable flag is set is authorized removal, and removal of the storage device from the predetermined information processor for which the removal-enable flag is not set is unauthorized removal.

6. The storage device according to claim 1, further comprising:
   a display configured to display that the first timer section is performing clocking operation.

7. A storage device comprising:
   a nonvolatile storage configured to store a portion of data;
   a volatile storage configured to store a remaining portion of the data;
   a refreshing section configured to refresh the volatile storage;
   a first timer section configured to count up to a first predetermined time period and to output a first count-up signal at an end of the first predetermined time period, the first timer section being configured to commence first clocking operation by means of taking as a trigger completion of use of the storage device by an authorized user, and to halt the first clocking operation by means of taking as a trigger initiation of use of the storage device by the authorized user;
   a second timer section configured to count up to a second predetermined time period shorter than the first predetermined time period and to output a second count-up signal at an end of the second predetermined time period, the second timer section being configured to commence second clocking operation by means of taking as a trigger unauthorized removal of the storage device from a predetermined information processor, and to halt the second, clocking operation by means of taking, as a trigger, initiation of use of the storage device by the authorized user; and
   a controller configured to erase the data stored in the volatile storage by halting refreshing operation of the refreshing section and based on at least either of the first count-up signal output from the first timer section and the second count-up signal output from the second timer section.

8. The storage device according to claim 7, wherein the first timer section resumes clocking operation from a point in time when previous clocking operation is halted, by means of taking as a trigger completion of use of the storage device by the authorized user.

9. The storage device according to claim 7, wherein the first predetermined time period is set to several hours to several days, and the second predetermined time period is set to several minutes.

10. The storage device according to claim 7, further comprising:
    a program storage configured to store an authentication program for authenticating the user as an authorized user.

11. The storage device according to claim 10, wherein the authentication program is executed by a processor provided in the storage device, sets a remove-enable flag when the user is authenticated as an authorized user, and does not set a remove-enable flag when the user cannot be authenticated as an authorized user, and removal of the storage device from the predetermined information processor for which the removal-enable flag is set is authorized removal, and removal of the storage device from the predetermined information processor for which the removal-enable flag is not set is unauthorized removal.

12. The storage device according to claim 7, further comprising:

a display configured to display that the first timer section is performing clocking operation.

13. The storage device according to claim 7, wherein directory information and file allocation table (FAT) information of the data are stored in the volatile storage.

* * * * *